(12) United States Patent
Zhou et al.

(10) Patent No.: US 11,683,316 B2
(45) Date of Patent: Jun. 20, 2023

(54) METHOD AND DEVICE FOR COMMUNICATION BETWEEN MICROSERVICES

(71) Applicant: CHINA UNIONPAY CO., LTD., Shanghai (CN)

(72) Inventors: Yongkai Zhou, Shanghai (CN); Danni Jiang, Shanghai (CN); Gaolei Zhang, Shanghai (CN); Dongjie He, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/596,420

(22) PCT Filed: Jul. 17, 2020

(86) PCT No.: PCT/CN2020/102847
§ 371 (c)(1),
(2) Date: Dec. 9, 2021

(87) PCT Pub. No.: WO2021/017907
PCT Pub. Date: Feb. 4, 2021

(65) Prior Publication Data
US 2022/0311773 A1   Sep. 29, 2022

(30) Foreign Application Priority Data

Jul. 29, 2019   (CN) .......................... 201910690826.8

(51) Int. Cl.
*H04L 9/40*   (2022.01)
*H04L 67/10*   (2022.01)

(52) U.S. Cl.
CPC ............ *H04L 63/101* (2013.01); *H04L 63/20* (2013.01); *H04L 67/10* (2013.01); *H04L 9/40* (2022.05); *H04L 63/10* (2013.01)

(58) Field of Classification Search
CPC ....... H04L 63/20; H04L 63/101; H04L 67/10; H04L 9/40; H04L 63/10
See application file for complete search history.

(56) References Cited

U.S. PATENT DOCUMENTS 10,489,275 B2 * 11/2019 Chunduri ................ H04L 67/51
2018/0113790 A1    4/2018 Chunduri et al.
(Continued)

FOREIGN PATENT DOCUMENTS

CN      107612955 A    1/2018
CN      108833462 A    11/2018
(Continued)

OTHER PUBLICATIONS

"Patterns For Distributed Transactions Within a Microservices Architecture"—Keyang Xiang, Red Hat, Oct. 1, 2018 https://developers.redhat.com/blog/2018/10/01/patterns-for-distributed-transactions-within-a-microservices-architecture# (Year: 2018).*
(Continued)

*Primary Examiner* — Randy A Scott
(74) *Attorney, Agent, or Firm* — Anova Law Group, PLLC (57) ABSTRACT

A method for communication between microservices, performed by a first host machine node, includes: obtaining a first microservice instance located on the first host machine node, determining a first microservice to which the first microservice instance belongs, and determining a list of triples corresponding to the first microservice according to the first microservice. The list of triples corresponding to the first microservice includes at least one triple, each triple of the at least one triple includes a visitor of the microservice, a visited party of the microservice, and an access port, and the visitor of the microservice of each triple included in the list of triples corresponding to the first microservice is the first microservice. The method also includes determining, by
(Continued)

the first host machine node, an access policy of the first microservice instance according to the list of triples corresponding to the first microservice.

20 Claims, 2 Drawing Sheets

(56) References Cited

U.S. PATENT DOCUMENTS

| | | |
|---|---|---|
| 2018/0241643 A1 | 8/2018 | Chaganti et al. |
| 2019/0058714 A1 | 2/2019 | Joshi et al. |
| 2019/0340059 A1* | 11/2019 | Bagarolo ............. G06F 8/71 |

FOREIGN PATENT DOCUMENTS

| | | |
|---|---|---|
| CN | 109032567 A | 12/2018 |
| CN | 109254859 A | 1/2019 |
| CN | 109408207 A | 3/2019 |
| CN | 109818902 A | 5/2019 |
| CN | 109995713 A | 7/2019 |
| CN | 110417777 A | 11/2019 |

OTHER PUBLICATIONS

"Securing Microservice APIs"—McLarty et al, O'Reilly, Jan. 29, 2018 https://docs.broadcom.com/doc/securing-microservice-apis-sustainable-and-scalable-access-control (Year: 2018).*
The World Intellectual Property Organization (WIPO) International Search Report for PCT /CN2020/102847 dated Sep. 29, 2020 4 pages.

* cited by examiner

METHOD AND DEVICE FOR COMMUNICATION BETWEEN MICROSERVICES

CROSS-REFERENCE TO RELATED APPLICATION

This application is a national phase entry under 35 U.S.C § 371 of International Application No. PCT/CN2020/102847, filed on Jul. 17, 2020, which claims priority of Chinese Patent Application No. 201910690826.8, entitled "Method and Device for Communication Between Microservices", filed with the State Intellectual Property Office of P. R. China on Jul. 29, 2019, the entire content of all of which is incorporated herein by reference.

FIELD OF THE DISCLOSURE

The present disclosure generally relates to the field of communication and, more particularly, relates to a method and a device for optimized communication between microservices.

BACKGROUND

With rise of lightweight and high-efficiency virtualization technology, such as container virtualization technology, cloud computing is developing in a direction of "cloud native." To make better use of elasticity of a cloud-native platform, a business may need to be transformed into a "microservice," and thus transformed into a true "cloud-native application." At present, the most popular cloud-native computing platform may be a container orchestration engine (Kubernetes, K8S), and a service mesh (SM) based on the Kubernetes. In the K8S, each big business may be deployed as a series of microservices, and each microservice may include a varying number of instances.

In existing technology, communication between microservices of a same business is usually performed by matching an access policy of a virtual IP addresses of a microservice to be accessed. Such a communication method may be feasible when the number of microservices is small. However, when the number of microservices is large, a large number of access policy entries may be generated, and thus overall query performance and efficiency of a system may be affected.

Consequently, in existing technology, in a case with a large number of microservices, communication between the microservices may generate a large number of access policy entries. Accordingly, overall query performance and efficiency of a system may be reduced. This is an urgent problem to be addressed.

BRIEF SUMMARY OF THE DISCLOSURE

The present disclosure provides a method and a device for optimized communication between microservices, which solve problems in existing technology that communications between microservices may generate a large number of access policy entries, with reduced query performance and efficiency of overall system.

The method for optimized communication between microservices provided by the present disclosure includes:
obtaining, by a first host machine node, a first microservice instance located on the first host machine node;
determining, by the first host machine node, a first microservice to which the first microservice instance belongs;
determining, by the first host machine node, a list of triples corresponding to the first microservice according to the first microservice. The list of triples corresponding to the first microservice includes at least one triple, each triple of the at least one triple includes a visiting party of the microservice, a visited party of the microservice, and an access port, and the visiting party of the microservice of each triple included in the list of triples corresponding to the first microservice is the first microservice; and
determining, by the first host machine node, an access policy of the first microservice instance according to the list of triples corresponding to the first microservice.

Optionally, after determining, by the first host machine node, the first microservice to which the first microservice instance belongs, the method also includes:
sending, by the first host machine node, the first microservice to a server; and
receiving the list of triples corresponding to the first microservice returned by the server.

Optionally, the method also includes:
obtaining, by the first host machine node, a second microservice instance located on the first host machine node; and
when a microservice to which the second microservice instance belongs is the first microservice;
the first host machine node does not need to send the first microservice to the server; and
determining, by the first host machine node, an access policy of the second microservice instance according to the list of triples corresponding to the first microservice.

Optionally, the method also includes:
when deleting, by the first host machine node, the first microservice instance, and when checking that the first microservice to which the first microservice instance belongs has no other instances on the first host machine node:
deleting the list of triples corresponding to the first microservice; and
deleting, by the first host machine node, the access policy of the first microservice instance.

Optionally, the method also includes:
adding a third microservice instance on the first host machine node, when checking that a second microservice to which the third microservice instance belongs has no other instances on the first host machine node:
according to the second microservice, determining, by the first host machine node, a list of triples corresponding to the second microservice, and according to the list of triples corresponding to the second microservice; and
determining, by the first host machine node, an access policy of the third microservice instance.

Optionally, the method also includes:
when deleting the first microservice instance and when checking that the first microservice to which the first microservice instance belongs has other instances on the first host machine node:
keeping access policies of the other instances of the first microservice determined according to the list of triples corresponding to the first microservice.

Optionally, the method also includes:
adding a third microservice instance, when checking that a second microservice to which the third microservice instance belongs has other instances on the first host machine node:
keeping an access policy of the third microservice instance determined according to the list of triples corresponding to the second microservice.

The device for optimized communication between microservices provided by the present disclosure includes:

an acquisition unit, configured to obtain a first microservice instance located on a first host machine node; and a determination unit, configured to determine a first microservice to which the first microservice instance belongs, and determine a list of triples corresponding to the first microservice according to the first microservice. The list of triples corresponding to the first microservice includes at least one triple. Each triple of the at least one triple includes a visiting party of the microservice, a visited party of the microservice, and an access port. The visiting party of the microservice of each triplet included in the list of triples corresponding to the first microservice is the first microservice; and the determination unit is also configured to determine an access policy of the first microservice instance according to the list of triples corresponding to the first microservice.

Optionally, the determination unit is also configured to:

send a first microservice to a server; and receive a list of triples corresponding to the first microservice returned by the server.

Optionally, the acquisition unit is also configured to:

obtain a second microservice instance located on the first host machine node; and when a microservice to which the second microservice instance belongs is the first microservice, determine an access policy of the second microservice instance according to a list of triples corresponding to the first microservice.

Optionally, the determination unit is also configured to:

when deleting the first microservice instance and when checking that the first microservice to which the first microservice instance belongs has no other instances on the first host machine node:

delete the list of triples corresponding to the first microservice; and delete the access policy of the first microservice instance.

Optionally, the determination unit is also configured to:

add a third microservice instance, when checking that the second microservice to which the third microservice instance belongs has no other instances on the first host machine node:

according to the second microservice, determine a list of triples corresponding to the second microservice, and according to the list of triples corresponding to the second microservice, determine an access policy of the third microservice instance.

Optionally, the determination unit is also configured to:

when deleting the first microservice instance and when checking that the first microservice to which the first microservice instance belongs has other instances on the first host machine node: keep the access policy of the other instances of the first microservice determined according to the list of triples corresponding to the first microservice.

Optionally, the determination unit is also configured to:

add a third microservice instance, when checking the second microservice to which the third microservice instance belongs has other instances on the first host machine node:

keep the access policy of the third microservice instance determined according to the list of triples corresponding to the second microservice.

The present disclosure also provides a computer device, including a program or an instruction. The program or the instruction is executed, the method provided by the present disclosure is executed.

The present disclosure also provides a storage medium, including a program or an instruction. The program or the instruction is executed, the method provided by the present disclosure is executed.

The method and the device for optimized communication between microservices provided by the present disclosure may have following advantages. By optimizing access policies of communication between microservices, overall query performance and efficiency of the communication between microservices may be improved.

DETAILED DESCRIPTION

To better understand the above technical solutions, the above technical solutions will be described below in detail in conjunction with accompanying drawings and specific implementations. It should be understood that embodiments of the present disclosure and specific features in the embodiments are descriptions of the technical solutions of the present disclosure, rather than limitations on the technical solutions of the present disclosure. When there is no conflict, the embodiments of the present disclosure and the technical features in the embodiments may be combined with each other.

In existing technology, the most popular cloud-native computing platform may be K8S and a service grid based on the K8S. In the K8S, each big business may be deployed as a series of microservices, and each microservice may include a varying number of instances. In the K8S, policy matching between microservices may be achieved mainly by network packet filtering management (IPtables) or network virtual service (IP Virtual Server, IPVS). Taking IPtables as an example, to access an instance under a microservice, as long as the host machine is stored with any instance of the business belonging to the microservice, access rules of each instance under each microservice of this business should be configured on the host machine.

Figure 1:
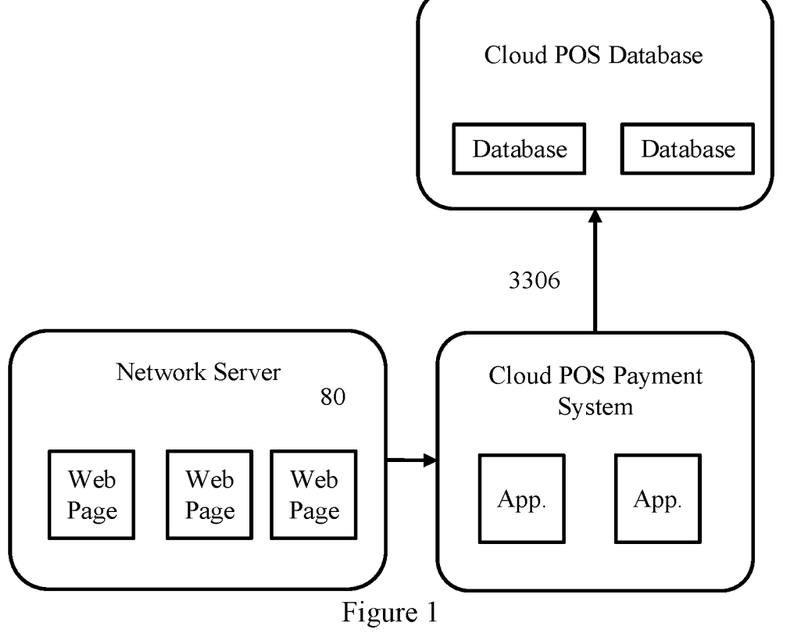
FIG. 1 illustrates a topological diagram of microservice access relationship of a cloud point-of-sale (POS) business in existing technology.

As an example, FIG. 1 illustrates a topological diagram of microservice access relationship of a cloud point-of-sale (POS) business in existing technology. As shown in FIG. 1, taking a POS business as an example, the business includes 3 microservices, namely microservice 1: web server APACHE, microservice 2: cloud POS payment system, and microservice 3: cloud POS database. The microservice 1 includes 4 instances, and virtual addresses of the 4 instances are 1.1, 1.2, 1.3, and 1.4 respectively. The microservice 2 includes 3 instances, and virtual addresses of the 3 instances are 2.1, 2.2, and 2.3 respectively. The microservice 3 includes 3 instances, and virtual addresses of the 3 instances are 3.1, 3.2, and 3.3 respectively.

Figure 2:
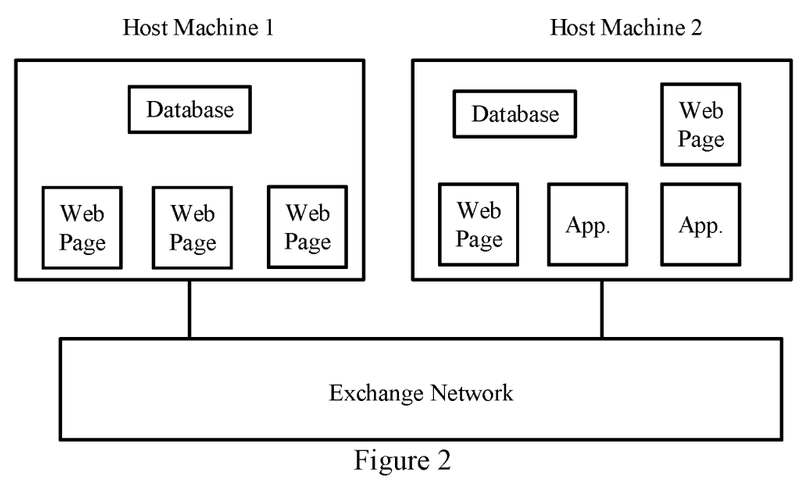
FIG. 2 illustrates a distribution diagram of microservice instances of a cloud POS business on a host machine in existing technology.

The instances of these microservices are distributed on two host machines, host machine 1 and host machine 2. FIG. 2 illustrates a distribution diagram of the microservice instances of the cloud POS business on the host machines in existing technology. As shown in FIG. 2, three instances of the microservice 1 and one instance of the microservice 3 are stored on the host machine 1, and one instance of the microservice 1, three instances of the microservice 2, and two instances of the microservice 3 are stored on the host machine 2. According to a communication method between microservices in existing technology, regardless of access to any instance of any microservice under the cloud POS business, access policies of each instance may need to be configured on the host machine 1 and the host machine 2. That is, 10 access policies (3+4+3=10) need to be configured on the host machine 1 and the host machine 2. In the access policies configured, any instance under a same microservice is directed to an instance that is finally accessed with an equal probability rule. This process may be expressed in pseudo codes as follows:

vip=1, port=any→ip=1.1, prob=1/4; (indicating that any instance that accesses the microservice 1 is transferred to an actual address 1.1 with a probability of 1/4, and the followings are similar)
vip=1, port=any→ip=1.2, prob=1/4;
vip=1, port=any→ip=1.3, prob=1/4;
vip=1, port=any→ip=1.4, prob=1/4;
vip=2, port=any→ip=2.1, prob=1/3;
vip=2, port=any→ip=2.2, prob=1/3;
vip=2, port=any→ip=2.3, prob=1/3;
vip=3, port=any→ip=3.1, prob=1/3;
vip=3, port=any→ip=3.2, prob=1/3;
vip=3, port=any→ip=3.3, prob=1/3;

It may be seen from the above example that when there is a plurality of microservices in a business, and the number of instances of each microservice is large, the number of entry policies on the host machines may become extremely large, not only occupying storage space, but also affecting query efficiency. Accordingly, arrangement of access policy entries in the communication between microservices needs to be optimized. In addition, in existing technology, security granularity of access policies may not be fine enough. In an existing implementation, networks between microservices under a same business may access each other by default, and refined access control may not be achieved. Accordingly, risk exposure may be increased, and security risks may not be controlled.

Figure 3:
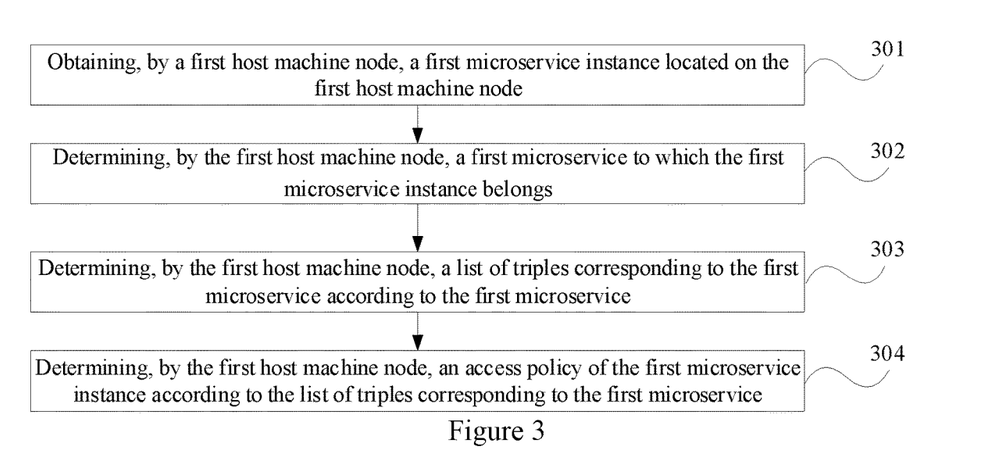
FIG. 3 illustrates a flowchart of a method for optimized communication between microservices, consistent with the disclosed embodiments of the present disclosure.

The present disclosure provides a method for optimized communication between microservices. FIG. 3 illustrates a flowchart of a method for optimized communication between microservices, consistent with the disclosed embodiments of the present disclosure. Specific steps of the method are described in detail below.

Step 301: obtaining, by a first host machine node, a first microservice instance located on the first host machine node;

Step 302: determining, by the first host machine node, a first microservice to which the first microservice instance belongs;

Step 303: determining, by the first host machine node, a list of triples corresponding to the first microservice according to the first microservice;

The list of triples corresponding to the first microservice includes at least one triple; each triple includes a visiting party of the microservice, a visited party of the microservice, and an access port; the visiting party of the microservice of each triple included in the list of triples corresponding to the first microservice is the first microservice;

Step 304: determining, by the first host machine node, an access policy of the first microservice instance according to the list of triples corresponding to the first microservice.

Figure 4:
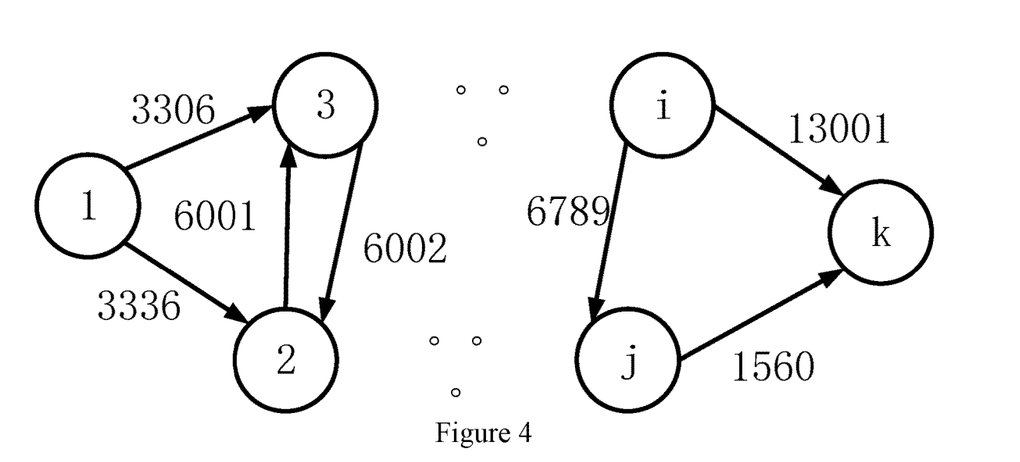
FIG. 4 illustrates a topology diagram of microservice access relationship of a method for optimized communication between microservices, consistent with the disclosed embodiments of the present disclosure.

Specifically, before the step 301, a user may register mutual access information between microservices on a server. FIG. 4 illustrates a topology diagram of microservice access relationship of a method for optimized communication between microservices, consistent with the disclosed embodiments of the present disclosure. According to the topology diagram of microservice access relationship shown in FIG. 4, each directed edge in the diagram may be converted into a triple, and registered with the system. Each triple may be logically represented as $(i_n, j_n, p_n)$, where in is a first key value, representing a visiting party of the microservice, $j_n$ is a second key value, representing a visited party of the microservice, and $p_n$ is a third key value, representing a port when in accesses $j_n$. For example, as shown in FIG. 4, the triple of the microservice 1 accessing the microservice 2 through port 3336 is represented as (1, 2, 3336), and the triple of the microservice 2 accessing the microservice 3 through port 6001 is represented as (2, 3, 6001).

Through the step 301 and the step 302, the first microservice to which the first microservice instance belongs may be determined on the first host machine node. Taking a microservice instance as an example, when the first host machine node includes a plurality of microservice instances, each of other microservice instances on the first host machine node may be checked. According to the corresponding relationship of the microservices to which the microservice instances belong, a list of each microservice contained on the first host machine node may be obtained.

Before the step 303, the first host machine node sends the first microservice to the server. After obtaining the list of triples corresponding to the first microservice by an enquiry, the first host machine node receives the list of triples corresponding to the first microservice returned by the server. When the first host machine node includes a second microservice instance, and a microservice to which the second microservice instance belongs is the first microservice, the first host machine node may not need to send the first microservice to the server for an enquiry, and the list of triples corresponding to the first microservice already obtained may be used.

In the step 303, the list of triples corresponding to the first microservice may be obtained according to the mutual access information between the microservices registered by the user on the server. For example, there are 10 microservices under a same business, namely microservice 1, microservice 2, . . . , microservice 10. The microservice 1 includes 3 instances, namely instance 1, instance 2 and instance 3. In the mutual access relationships between microservices registered by the user on the server, relationships involving the microservice 1 may include (1, 2, 3336) and (1, 3, 3306). The instance 1 under microservice 1 is on the first host machine node. Accordingly, the list of triples corresponding to microservice 1 may include two triples, that is, (1, 2, 3336) and (1, 3, 3306) when the microservice 1 is the visiting party.

In the step 304, after the list of triples on the first host machine node is determined, since the list of triples is a representation of the logical relationship between microservices, in communication between microservices, the list of triples needs to be converted into a network access policy that may be identified and executed during network communication through a rule distribution engine. For example, the K8S and a service grid based on the K8S are a popular cloud native computing platform. In the K8S, each big business may be deployed as a series of microservices, and each microservice contains a varying number of instances. Policy matching of the communication between microservices of the K8S may be achieved mainly relying on network packet filtering management (IPtables) or network virtual services (IP Virtual Server, IPVS). Correspondingly, the list of triples here needs to be converted to an access policy of IPtables or IPVS for policy matching.

Steps 301-304 complete optimization work of access policies in existing technology, in a case when there is no instance change on the host machine node. Cases when an instance is changed on the host machine node are described in detail as follows.

In a case when an instance needs to be deleted on the host machine node due to storage space and other reasons, specific steps are as follows.

Step 305: when the first microservice instance on the first host machine node is deleted, and the first microservice to which the first microservice instance belongs has no other instances on the first host machine node: deleting the list of triples corresponding to the first microservice, and deleting, by the first host machine node, the access policy of the first microservice instance.

Step 306: when the first microservice instance on the first host machine node is deleted, and the first microservice to which the first microservice instance belongs has other instances on the first host machine node: keeping access policies of other instances of the first microservice determined by the first host machine node according to the list of triples corresponding to the first microservice.

In the step 305, for example, the first microservice has 3 instances, namely instance 1, instance 2 and instance 3. The instance 1 is stored on the first host machine node, and the instances 2 and 3 are stored on the second host machine node. The access policy of the first microservice to which the instance 1 belongs may be represented by triples as (1, 2, 3336) and (1, 3, 3306). In a case when the instance 1 is deleted, there is no longer any instance under the first microservice on the first host machine node. In this case, the list of triples (1, 2, 3336) and (1, 3, 3306) of the first microservice related to the access policy on the first host machine node may need to be deleted.

The step 305 illustrates a condition when the first microservice instance on the first host machine node is deleted and when the first microservice to which the first microservice instance belongs has no other instances on the first host machine node. The step 306 illustrates a condition when the first microservice instance on the first host machine node is deleted and when the first microservice to which the first microservice instance belongs has other instances on the first host machine node.

For example, the first microservice has 3 instances, namely instance 1, instance 2, and instance 3. Among them, the instance 1 and the instance 2 are stored on the first host machine node, and the instance 3 is stored on the second host machine node. The access policy of the first microservice to which instance 1 belongs is represented by triples as (1, 2, 3336) and (1, 3, 3306). In a case when the instance 1 is deleted, the instance 2 under the first microservice still exists on the first host machine node. In this case, an operation of deleting the access policy of the first microservice is not needed, and the access policy of the first microservice on the first host machine node may be kept.

The steps 305-306 are from a perspective of deleting instances on the host machine node. Following steps 307-308 are from a perspective of adding instances on the host machine node. Specific steps are as follows.

Step 307: adding a third microservice instance to the first host machine node, when the second microservice to which the third microservice instance belongs has no other instances on the first host machine node: determining, by the first host machine node, a list of triples corresponding to the second microservice according to the second microservice, and determining, by the first host machine node, an access policy of the third microservice instance according to the list of triples corresponding to the second microservice.

Step 308: adding a third microservice instance to the first host machine node, when the second microservice to which the third microservice instance belongs has other instances on the first host machine node: keeping the access policy of the third microservice instance determined by the first host machine node according to the list of triples corresponding to the second microservice.

Among them, in the step 307, for example, the second microservice includes 3 instances, namely instance 1, instance 2 and instance 3. The instance 1 is stored on the second host machine node, and the instance 2 and instance 3 are stored on the third host machine node. The access policy of the second microservice is represented by a triple (2, 3, 6001). It may be seen that each instance of the second microservice does not exist on the first host machine node. Considering the optimization of storage space between host machines, when the instance 3 is removed from the third host machine node and added to the first host machine node, the triple (2, 3, 6001) involving the second microservice in the access policy on the first host machine node may need to be added.

The step 307 illustrates a condition of adding a third microservice instance to the first host machine node and when the second microservice to which the third microservice instance belongs does not have other instances on the first host machine node. The step 308 illustrates a condition of adding a third microservice instance to the first host machine node and when the second microservice to which the third microservice instance belongs has other instances on the first host machine node.

For example, the second microservice includes 3 instances, namely instance 1, instance 2 and instance 3. Among them, the instance 1 is stored on the first host machine node, and the instance 2 and the instance 3 are stored on the third host machine node. The access policy of the second microservice is represented by a triple (2, 3, 6001). Considering the optimization of storage space between host machines, when the instance 3 is removed from the third host machine node and added to the first host machine node, the instance 1 under the second microservice still exists on the first host machine node. In this case, an operation of adding the access policy of the second microservice may not be needed, and the access policy of the second microservice on the first host machine node may be kept.

By combining the cloud POS business in the embodiment of the existing technology shown in FIG. 1, a method for optimized communication between microservices provided by the present disclosure is illustrated below. As shown in FIG. 1, the access relationship between the three microservices may be represented by triples (1, 2, 80) and (2, 3, 3306). Combining the distribution of microservice instances of the cloud POS business on the host machines shown in FIG. 2, three instances of the microservice 1 and one instance of the microservice 3 are stored on the host machine 1, and one instance of the microservice 1, three instances of the microservice 2, and two instances of the microservice 3 are stored on the host machine 2. The microservice instances may be configured on the host machine 1 and the host machine 2 according to the access policy corresponding to the list of triples, as follows:

On the host machine 1, only the policies for accessing microservice 2 need to be configured:
vip=2, port=80→ip=2.1, prob=1/3;
vip=2, port=80→ip=2.2, prob=1/3;
vip=2, port=80→ip=2.3, prob=1/3;

On the host machine 2, only the policies for accessing microservice 2 and the policies for accessing microservice 3 need to be configured:
vip=2, port=80→ip=2.1, prob=1/3;
vip=2, port=80→ip=2.2, prob=1/3;
vip=2, port=80→ip=2.3, prob=1/3;
vip=3, port=3306→ip=3.1, prob=1/3;
vip=3, port=3306→ip=3.2, prob=1/3;
vip=3, port=3306→ip=3.3, prob=1/3;

It may be seen that the number of the access policies for the host machine 1 is reduced to 3, and the number of the access policies for the host machine 2 is reduced to 6. In existing technology, 10 access policies are configured on the host machine 1 and the host machine 2 respectively. Accordingly, in the present disclosure, each of the number of access policies for the host machine 1 and the number of access policies for the host machine 2 is decreased, and granularity of the access policies is more refined. As such, while the access policies may be optimized, security of communication between microservices may be improved.

Figure 5:
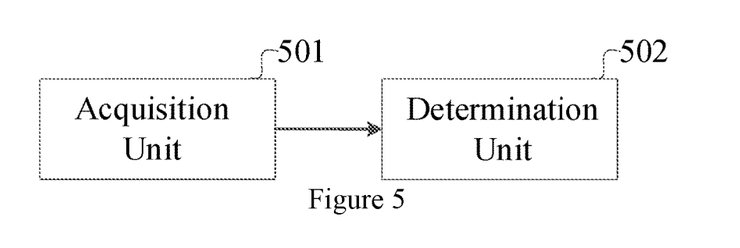
FIG. 5 illustrates a schematic diagram of a device for a method for optimized communication between microservices, consistent with the disclosed embodiments of the present disclosure.

FIG. 5 illustrates a schematic diagram of a device for a method for optimized communication between microservices, consistent with the disclosed embodiments of the present disclosure. As shown in FIG. 5, the device includes an acquisition unit 501 and a determination unit 502. The acquisition unit 501 and the determination unit 502 are described in detail as follows.

The acquisition unit 501 is configured to obtain a first microservice instance located on the first host machine node;

The determination unit 502 is configured to determine a first microservice to which the first microservice instance belongs, and determine a list of triples corresponding to the first microservice according to the first microservice. The list of triples corresponding to the first microservice includes at least one triple, and each triple includes a visiting party of the microservice, a visited party of the microservice, and an access port. The visiting party of the microservice of each triplet included in the list of triples corresponding to the first microservice is the first microservice.

The determination unit 502 is also configured to determine an access policy of the first microservice instance according to the list of triples corresponding to the first microservice.

In one embodiment, the determination unit 502 is also configured to:
send a first microservice to a server; and
receive a list of triples corresponding to the first microservice returned by the server.

In one embodiment, the acquisition unit 501 is also configured to:
obtain a second microservice instance located on the first host machine node;
when a microservice to which the second microservice instance belongs is the first microservice, determine an access policy of the second microservice instance according to a list of triples corresponding to the first microservice.

In one embodiment, the determination unit 502 is also configured to:
when deleting the first microservice instance and when checking that the first microservice to which the first microservice instance belongs has no other instances on the first host machine node:
delete the list of triples corresponding to the first microservice; and
delete the access policy of the first microservice instance.

In one embodiment, the determination unit 502 is also configured to:
add a third microservice instance, when checking that the second microservice to which the third microservice instance belongs has no other instances on the first host machine node:
according to the second microservice, determine a list of triples corresponding to the second microservice; and
according to the list of triples corresponding to the second microservice, determine an access policy of the third microservice instance.

In one embodiment, the determination unit 502 is also configured to:
when deleting the first microservice instance and when the first microservice to which the first microservice instance belongs has other instances on the first host machine node:
keep the access policy of the other instances of the first microservice determined according to the list of triples corresponding to the first microservice.

In one embodiment, the determination unit 502 is also configured to:
add a third microservice instance, when checking that the second microservice to which the third microservice instance belongs has other instances on the first host machine node:
keep the access policy of the third microservice instance determined according to the list of triples corresponding to the second microservice.

It should be noted that those skilled in the art should understand that the embodiments of the present disclosure may be provided as methods, systems, or computer program products. Accordingly, the present disclosure may adopt a form of a complete hardware embodiment, a complete software embodiment, or an embodiment combining software and hardware. Moreover, the present disclosure may adopt a form of a computer program product implemented on one or a plurality of computer-usable storage media (including but not limited to disk storage, optical storage, etc.) containing computer-usable program codes.

The present disclosure is described with reference to flowcharts and/or block diagrams of methods, devices (systems), and computer program products according to various embodiments of the present disclosure. It should be understood that each process and/or block in the flowcharts and/or block diagrams, and the combination of processes and/or blocks in the flowcharts and/or block diagrams may be implemented by computer program instructions. Such computer program instructions may be provided to the processor of a general-purpose computer, a special-purpose computer, an embedded processor, or other programmable data processing apparatus, such that the instructions executed by the processor of the computer or other programmable data processing apparatus may implement the functions specified in one or more processes in the flowcharts and/or one or more blocks in the block diagrams.

Such computer program instructions may also be stored in a computer-readable memory that can direct a computer or other programmable data processing apparatus to work in a specific manner, such that the instructions stored in the computer-readable memory produce a manufacturing article including the instruction device. The instruction device implements the functions specified in one or more processes in the flowcharts and/or one or more blocks in the block diagrams.

Obviously, those skilled in the art may make various changes and modifications to the present disclosure without departing from the spirit and scope of the present disclosure. If these modifications and variations of the present disclosure fall within the scope of the claims of the present disclosure and their equivalent technologies, the present disclosure also intends to include these changes and modifications.

What is claimed is:

1. A method for an optimized communication between microservices, comprising:
    obtaining, by a first host machine node, a first microservice instance located on the first host machine node;
    determining, by the first host machine node, a first microservice to which the first microservice instance belongs;
    determining, by the first host machine node, a list of triples corresponding to the first microservice according to the first microservice, wherein the list of triples corresponding to the first microservice includes at least one triple, each triple of the at least one triple includes a visiting party of the microservice, a visited party of the microservice, and an access port, and the visiting party of the microservice of each triple included in the list of triples corresponding to the first microservice is the first microservice; and
    determining, by the first host machine node, an access policy of the first microservice instance according to the list of triples corresponding to the first microservice.

2. The method according to claim 1, after determining, by the first host machine node, the first microservice to which the first microservice instance belongs, further comprising:
    sending, by the first host machine node, the first microservice to a server; and
    receiving the list of triples corresponding to the first microservice returned by the server.

3. The method according to claim 1, further comprising:
    obtaining, by the first host machine node, a second microservice instance located on the first host machine node, wherein
        when a microservice to which the second microservice instance belongs is the first microservice,
        the first host machine node does not need to send the first microservice to the server; and
        the first host machine node determines an access policy of the second microservice instance according to the list of triples corresponding to the first microservice.

4. The method according to claim 1, further comprising:
    when deleting the first microservice instance on the first host machine node and when checking that the first microservice to which the first microservice instance belongs has no other instances on the first host machine node:
    deleting the list of triples corresponding to the first microservice; and
    deleting, by the first host machine node, the access policy of the first microservice instance.

5. The method according to claim 1, further comprising:
    adding a third microservice instance on the first host machine node, when checking that a second microservice to which the third microservice instance belongs has no other instances on the first host machine node:
        according to the second microservice, determining, by the first host machine node, a list of triples corresponding to the second microservice; and
        according to the list of triples corresponding to the second microservice, determining, by the first host machine node, an access policy of the third microservice instance.

6. The method according to claim 1, further comprising:
    when deleting the first microservice instance on the first host machine node and when checking that the first microservice to which the first microservice instance belongs has an other instance on the first host machine node:
    keeping, by the first host machine node, an access policy of the other instance of the first microservice determined according to the list of triples corresponding to the first microservice by the first host machine node.

7. The method according to claim 1, further comprising:
    adding a third microservice instance on the first host machine node, when checking that a second microservice to which the third microservice instance belongs has an other instance on the first host machine node:
        keeping an access policy of the third microservice instance determined according to a list of triples corresponding to the second microservice by the first host machine node.

8. A computer device, comprising:
    a memory, configured to store a program or an instruction; and
    a processor, coupled with the memory and configured, when the program or the instruction is executed, to perform:
    obtaining a first microservice instance located on a first host machine node;
    determining a first microservice to which the first microservice instance belongs;
    determining a list of triples corresponding to the first microservice according to the first microservice, wherein the list of triples corresponding to the first microservice includes at least one triple, each triple of the at least one triple includes a visiting party of the microservice, a visited party of the microservice, and an access port, and the visiting party of the microservice of each triple included in the list of triples corresponding to the first microservice is the first microservice; and
    determining an access policy of the first microservice instance according to the list of triples corresponding to the first microservice.

9. The computer device according to claim 8, wherein after determining the first microservice to which the first microservice instance belongs, the processor is further configured to perform:
    sending the first microservice to a server; and
    receiving the list of triples corresponding to the first microservice returned by the server.

10. The computer device according to claim 8, wherein the processor is further configured to perform:
    obtaining a second microservice instance located on the first host machine node, wherein
        when a microservice to which the second microservice instance belongs is the first microservice, the first host machine node does not need to send the first microservice to the server; and the first host machine node determines an access policy of the second microservice instance according to the list of triples corresponding to the first microservice.

11. The computer device according to claim 8, wherein the processor is further configured to perform:

when deleting the first microservice instance on the first host machine node and when checking that the first microservice to which the first microservice instance belongs has no other instances on the first host machine node:

deleting the list of triples corresponding to the first microservice; and deleting the access policy of the first microservice instance.

12. The computer device according to claim 8, wherein the processor is further configured to perform:

adding a third microservice instance on the first host machine node, when checking that a second microservice to which the third microservice instance belongs has no other instances on the first host machine node:

according to the second microservice, determining a list of triples corresponding to the second microservice; and according to the list of triples corresponding to the second microservice, determining an access policy of the third microservice instance.

13. The computer device according to claim 8, wherein the processor is further configured to perform:

when deleting the first microservice instance on the first host machine node and when checking that the first microservice to which the first microservice instance belongs has an other instance on the first host machine node:

keeping an access policy of the other instance of the first microservice determined according to the list of triples corresponding to the first microservice by the first host machine node.

14. The computer device according to claim 8, wherein the processor is further configured to perform:

adding a third microservice instance on the first host machine node, when checking that a second microservice to which the third microservice instance belongs has an other instance on the first host machine node:

keeping an access policy of the third microservice instance determined according to a list of triples corresponding to the second microservice by the first host machine node.

15. A non-transitory computer readable storage medium, comprising a program or an instruction, wherein: when executed by a processor of a first host machine node, the program or the instruction causes the processor to perform:

obtaining a first microservice instance located on the first host machine node;

determining a first microservice to which the first microservice instance belongs;

determining a list of triples corresponding to the first microservice according to the first microservice, wherein the list of triples corresponding to the first microservice includes at least one triple, each triple of the at least one triple includes a visiting party of the microservice, a visited party of the microservice, and an access port, and the visiting party of the microservice of each triple included in the list of triples corresponding to the first microservice is the first microservice; and determining an access policy of the first microservice instance according to the list of triples corresponding to the first microservice.

16. The storage medium according to claim 15, wherein after determining the first microservice to which the first microservice instance belongs, the program or the instruction further causes the processor to perform:

sending the first microservice to a server; and receiving the list of triples corresponding to the first microservice returned by the server.

17. The storage medium according to claim 15, wherein the program or the instruction further causes the processor to perform:

obtaining a second microservice instance located on the first host machine node, wherein when a microservice to which the second microservice instance belongs is the first microservice, the first host machine node does not need to send the first microservice to the server; and the first host machine node determines an access policy of the second microservice instance according to the list of triples corresponding to the first microservice.

18. The storage medium according to claim 15, wherein the program or the instruction further causes the processor to perform:

when deleting the first microservice instance on the first host machine node and when checking that the first microservice to which the first microservice instance belongs has no other instances on the first host machine node:

deleting the list of triples corresponding to the first microservice; and deleting the access policy of the first microservice instance.

19. The storage medium according to claim 15, wherein the program or the instruction further causes the processor to perform:

adding a third microservice instance on the first host machine node, when checking that a second microservice to which the third microservice instance belongs has no other instances on the first host machine node:

according to the second microservice, determining a list of triples corresponding to the second microservice; and according to the list of triples corresponding to the second microservice, determining an access policy of the third microservice instance.

20. The storage medium according to claim 15, wherein the program or the instruction further causes the processor to perform:

when deleting the first microservice instance on the first host machine node and when checking that the first microservice to which the first microservice instance belongs has an other instance on the first host machine node:

keeping an access policy of the other instance of the first microservice determined according to the list of triples corresponding to the first microservice by the first host machine node.

* * * * *